United States Patent [19]

Songer

[11] Patent Number: 5,114,181
[45] Date of Patent: May 19, 1992

[54] CRASH PAD FOR VEHICLE STEERING WHEEL

[76] Inventor: Richard B. Songer, P.O. Box 17558, Fountain Hills, Ariz. 85269

[21] Appl. No.: 570,040

[22] Filed: Aug. 20, 1990

[51] Int. Cl.⁵ ............................................. B60R 21/05
[52] U.S. Cl. .................................... 280/750; 200/751
[58] Field of Search ................................ 280/750, 751

[56] References Cited

U.S. PATENT DOCUMENTS

| | | | |
|---|---|---|---|
| 2,784,006 | 3/1957 | Dye et al. | 280/750 |
| 2,866,357 | 12/1958 | Houghtaling | 280/750 |
| 3,189,367 | 6/1965 | Glass | 280/750 |
| 3,493,244 | 2/1970 | Bozich | 280/750 |
| 4,287,621 | 9/1981 | Kertz | 280/750 |

*Primary Examiner*—Kenneth R. Rice
*Attorney, Agent, or Firm*—Barnes, Kisselle, Raisch, Choate, Whittemore & Hulbert

[57] ABSTRACT

An attachment for the steering wheel of a vehicle for preventing facial, head, eye and chest to a driver in the event of sudden impact of a vehicle. A buffer pad of energy absorbing material such as a foam rubber or a polyurethane foam is attached to the steering wheel on the operator side with clearance for gripping the wheel and an oval opening is provided to allow visual access to the speedometer and dashboard gauges. The oval opening also will receive the facial features of a driver upon vehicle impact and thus protect the face against injury.

4 Claims, 1 Drawing Sheet

CRASH PAD FOR VEHICLE STEERING WHEEL

FIELD OF INVENTION

Safety attachments for vehicle steering wheels which provide energy absorption in the event of forward impact.

BACKGROUND AND FEATURES OF THE INVENTION

Many devices have been proposed for protection of a vehicle operator in the event of a sudden forward impact. Even with the use of seat belts and shoulder restraints, the head of the operator may be thrown forward to the extent that the face hits the steering wheel and severe facial and dental injuries are incurred.

Examples of previously proposed devices are found in U.S. Pat. No. 1,647,903 (1927), where a spring supported contact plate is utilized. In U.S. Pat. No. 2,784,006 (1957) a cushioned shell or plate is shown. In U.S. Pat. No. 3,435,701 (1969) a deep dished steering wheel is shown with a central core of soft spongy, stacked pads, the wheel support being resiliently mounted to collapse and expose the pads to receive the face or chest of the operator.

The present invention contemplates an inexpensive attachment which can be applied to any existing steering wheel with no special tools and no alteration of the wheel itself.

It is an object, therefore, to provide a cushion to absorb energy in the event of sudden forward contact when the head of an operator is thrown forward into the steering wheel area.

Objects and features of the invention will be apparent in the following description and claims in which the invention is set forth together with details to enable persons skilled in the art to practice the invention all in connection with the best mode presently contemplated for the invention.

BRIEF DESCRIPTION OF THE DRAWINGS

DRAWINGS accompany the disclosure and the various views thereof may be briefly described as.

DESCRIPTION OF THE INVENTION AND THE MANNER AND PROCESS OF USING IT

Figure 1:
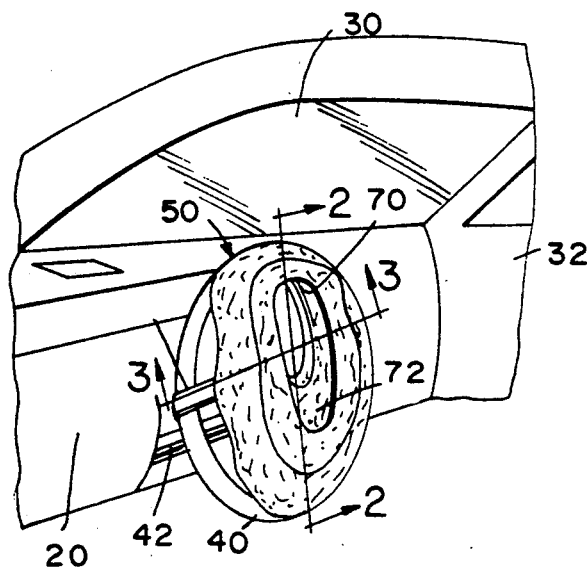
FIG. 1, a perspective view of the interior of a vehicle and the protective device applied to a steering wheel.

With reference to FIG. 1, the interior of the front seat of a vehicle is illustrated with an instrument panel 20 and windshield 30 and passenger side door 32. A steering wheel 40 on a steering column 42 is illustrated. The wheel 40 has the usual spokes or cross-pieces which are not shown.

Figure 2:
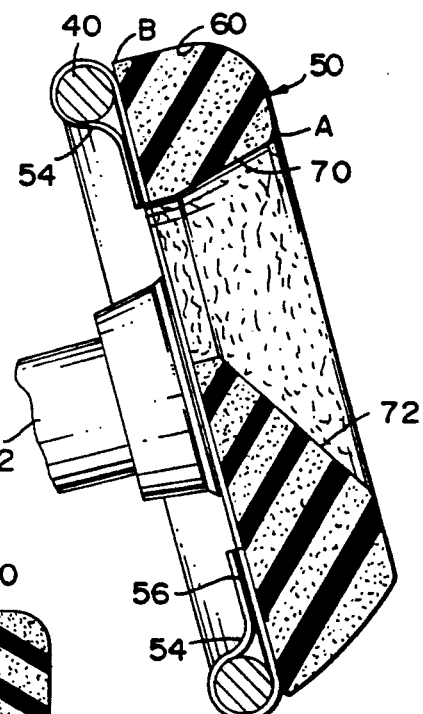
FIG. 2, a sectional view on line 2—2 of FIG. 1.
Figure 3:
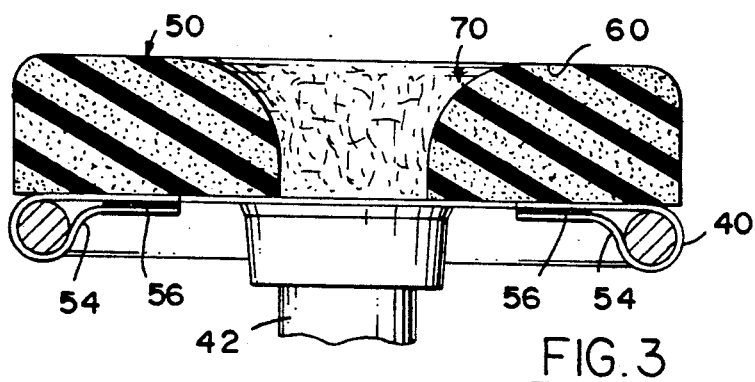
FIG. 3, a sectional view on line 3—3 of FIG. 1.
Figure 4:
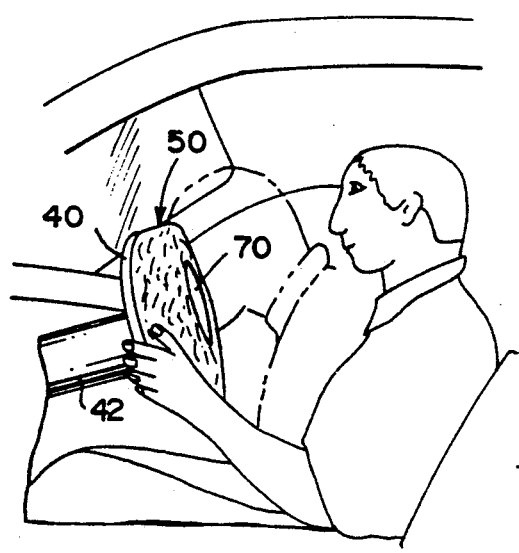
FIG. 4, an illustration of the relationship of an operator before and after an impact.

The head and face protector buffer pad 50 is shown in place on the steering wheel secured by Velcro TM straps 54, shown also in FIGS. 1, 2 and 3, which wrap around the steering wheel or spokes and are secured at the Velcro TM areas 56. Other strap devices could also be used.

The outer profile of the buffer pad 50 is illustrated in FIG. 1 as having a generally oval shape with shallow indentation at 2 o'clock, 4 o'clock, 8 o'clock, and 10 o'clock. The indentations expose the periphery of the steering wheel to enable the operator to grasp the wheel in the normal way.

The buffer pad 50 is preferably formed of foam rubber or foam polyurethane, or similar material, which has good resilience and ultimate resistance to total collapse upon compression. A skin 60 is preferably provided on the foam material to close the outer cells and protect the pad against loss of portions due to accidental or intentional picking of the surface, and also allows cleaning of the surface. The thickness of the pad is preferably three to four inches to provide the required resistance.

The buffer is formed with a central opening 70 which is generally an oval egg-shaped recess as shown in FIGS. 1 and 2, and the lower portion tapers to a greater degree downwardly and outwardly at 72 as shown in these FIGS. The long axis of the oval is vertically disposed. This opening 70 allows the operator to see the speedometer dial on the instrument panel, which is usually directly in front of the steering wheel, and also other dashboard dials. This also allows access to the horn button which is usually centrally located.

Figure 5:
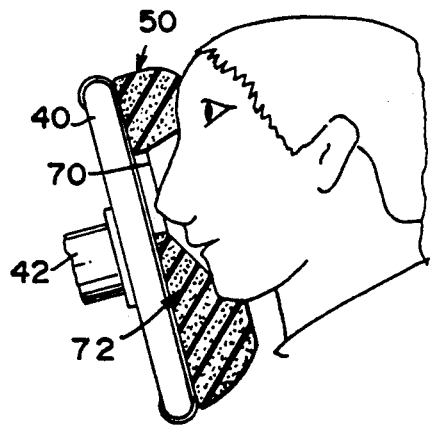
FIG. 5, an illustration of the manner in which the protective device receives the face and head of an operator in a crash situation.

In a crash situation, the head of the operator will move forward by inertial forces and the face will plunge into the buffer pad and opening 70. FIG. 5 illustrates the manner in which the head and face of a driver will be thrown by inertial forces into the buffer on sudden vehicle impact. The forehead will contact and compress the top of the buffer above the point A. The chin will contact and compress the lower part of the buffer and the nose, eyes, mouth and chin will softly and safely enter the oval opening as shown in FIG. 5 and thus be protected against impact with unyielding surfaces. The resistance of the pad to compression will accordingly prevent the head and face from reaching the hard elements of the steering wheel. The upward component of force of the forehead against the top of the buffer will compress the buffer pad between points A and B toward the top of the wheel and thus increase the sectional dimension of the pad to crash resistance.

The device as described can be made and sold at a reasonable price and thus be available as an accessory to all existing vehicles that would not have air bags or other restraints as original equipment.

What is claimed is:

1. A crash pad buffer for vehicle steering wheel which comprises:
    (a) a soft annular relatively thick foam pad dimensioned to fit on the operator side of a vehicle steering wheel,
    (b) circumferential indentation at spaced areas on the periphery of the pad to provide operator hand access to the steering wheel,
    (c) releasable means to secure said buffer pad to the steering wheel,
    (d) an opening formed in said pad for visual access to a vehicle instrument panel, the margins of which openings receive and protect the head, eyes, nose, mouth and chin of a driver upon sudden impact of the vehicle,
    (e) the opening being oval and egg-shaped with the long axis of the oval vertically disposed and the walls of the opening tapering outwardly and the lower surface tapering downwardly to the greater degree.

2. A crash pad buffer for a vehicle steering wheel having an annular rim for use with passenger vehicles which comprises:
(a) a soft annular relatively thick foam pad to fit on the operator side of a vehicle steering wheel, said pad lying in a plane and having top and bottom arcuate portions to overlie the top and bottom portions of the rim of the steering wheel, said pad having an outer face on the driver side and an inner face on the steering wheel side, and
(b) an elongate diametrical opening formed within the outer margins of said pad between the top and bottom portions of the pad and between the outer face of the pad and the inner steering wheel face to permit visual access to an instrument panel of a vehicle, said opening having a top and side walls extending from the outer face of the pad to the inner face of the pad, and a bottom wall angled from the inner face of the pad to the outer face outwardly and downwardly toward the bottom of a portion of the pad and the outer face,
the margins of said pad surrounding said opening and overlying said steering wheel rim providing crash protection for the forehead, face and chin of an operator in the event of a sudden stop or frontal crash.

3. A crash pad buffer for a vehicle steering wheel having an annular rim which comprises:
(a) a soft annular relatively thick foam pad to fit on the operator side of a vehicle steering wheel, said pad lying in a plane and having top and bottom arcuate portions to overlie the top and bottom portions of the rim of the steering wheel, said pad having an outer face on the driver side and an inner face on the steering wheel side, and
(b) an elongate diametrical opening formed within the outer margins of said pad between the top and bottom portions of the pad and between the outer face of the pad and the inner steering wheel face to permit visual access to an instrument panel of a vehicle, said opening having a top wall essentially perpendicular to the plane of the pad, side walls curved from the outer face of the pad to the inner face of the pad, and a bottom wall angled from the inner face of the pad to the outer face outwardly and downwardly toward the bottom of a portion of the pad and the outer face,
the margins of said pad surrounding said opening and overlying said steering wheel rim providing crash protection for the forehead, face and chin of an operator in the event of a sudden stop or frontal crash.

4. A crash pad buffer for a vehicle steering wheel having an annular rim for use with passenger vehicles which comprises:
(a) a soft annular relatively thick foam pad to fit on the operator side of a vehicle steering wheel, said pad lying in a plane and having top and bottom arcuate portions to overlie the top and bottom portions of the rim of the steering wheel, and circumferential indentations on the sides of the pad between the top and bottom arcuate portions to provide operator-hand-access to the rim of the steering wheel, said pad having an outer face on the driver side and an inner face on the steering wheel side, and
(b) an elongate diametrical opening formed within the outer margins of said pad between the top and bottom portions of the pad and between the outer face of the pad and the inner steering wheel face to permit visual access to an instrument panel of a vehicle, said opening having a top wall essentially perpendicular to the plane of the pad, side walls curved inwardly from the outer face of the pad to the inner face of the pad and a bottom wall angled from the inner face of the pad to the outer face outwardly and downwardly toward the bottom of a portion of the pad and the outer face,
the margins of said pad surrounding said opening and overlying said steering wheel rim providing crash protection for the forehead, face and chin of an operator in the event of a sudden stop or frontal crash.

* * * * *